Dec. 17, 1935.       H. S. FRASER       2,024,761
VALVE CONTROL
Filed Oct. 13, 1930
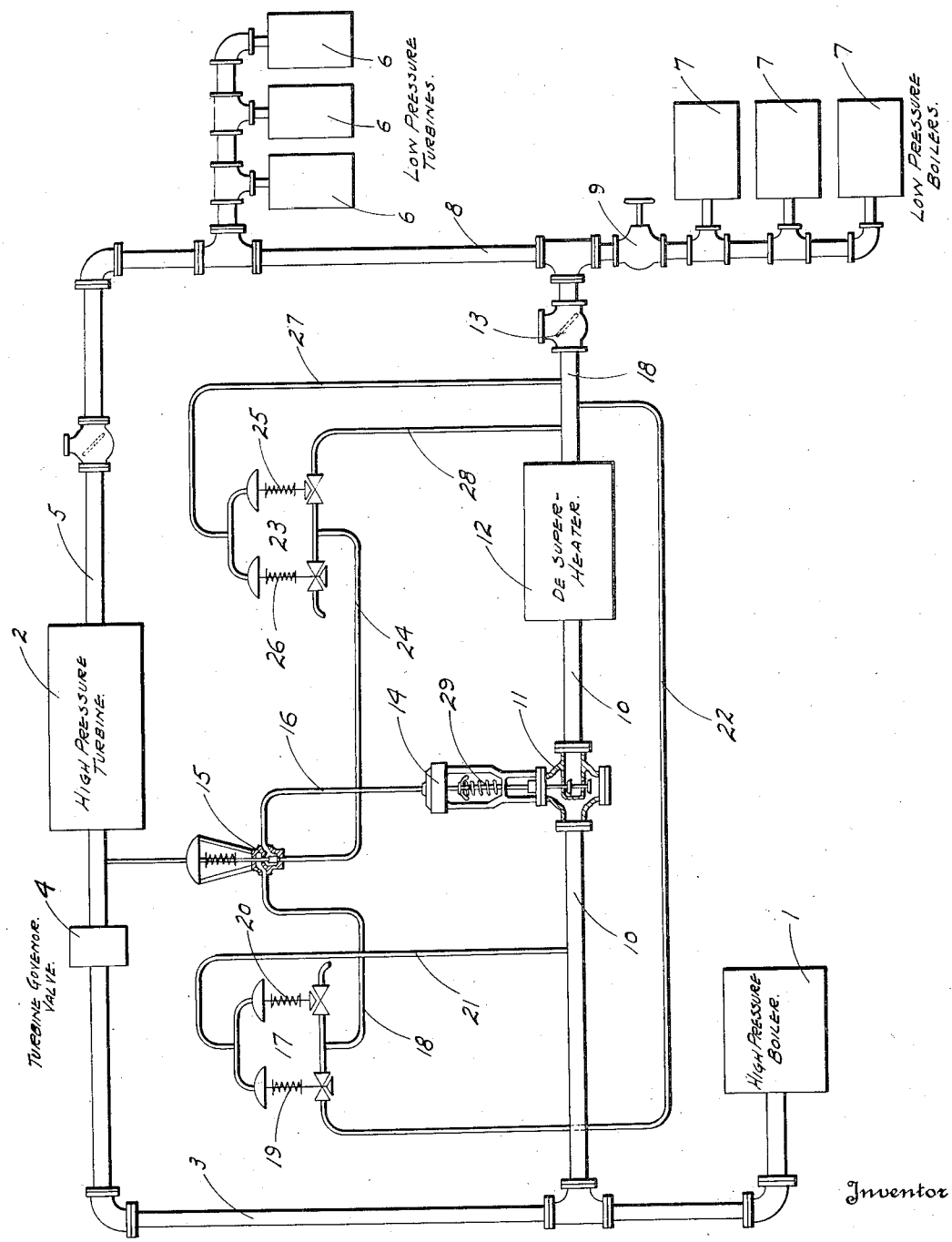
Inventor
HOWARD S. FRASER.
By Ricky & Watts
Attorney Patented Dec. 17, 1935

2,024,761

UNITED STATES PATENT OFFICE 2,024,761

VALVE CONTROL

Howard S. Fraser, New York, N. Y., assignor to The Swartwout Company, Cleveland, Ohio, a corporation of Ohio Application October 13, 1930, Serial No. 488,223

14 Claims. (Cl. 137—153)

This invention relates to apparatus for controlling the operation of a valve and more particularly to a system of pressure actuated valves interconnected to control the action of fluid under pressure upon the diaphragm of a valve in a steam line whereby said valve will act either as a relief valve or as a reducing valve depending upon certain external conditions.

It is among the objects of my invention to provide apparatus for controlling a valve or valves in a steam line in accordance with the pressure conditions in the steam line whereby under certain conditions the valve will act as a relief valve and under certain other conditions the valve will act as a pressure reducing valve.

Another object of my invention is the provision of apparatus for automatically connecting the diaphragm of one or more pressure actuated valves to either of two pressure control means.

Another object is the provision of a valve connected to a steam line and adapted to act as a relief valve when steam is flowing through the line under certain conditions and to act as a reducing valve when the flow occurs under other conditions.

Other objects of my invention will appear from the following description of one embodiment thereof, reference being had to the accompanying drawing which diagrammatically illustrates my improved valve hook-up installed in a steam power plant which includes a high pressure boiler, a high pressure turbine, low pressure boilers and low pressure turbines.

Referring to the drawing the high pressure boiler 1 generates steam which is conducted to the high pressure turbine 2 through the pipe 3. A turbine governor valve 4 in the steam pipe 3 is adapted to control the operation of the turbine 2. The exhaust from the turbine 2 passes out through a pipe 5 and may be used for operation of the low pressure turbines. The low pressure turbines 6 are connected to the low pressure boilers 7 by the pipe 8 and a valve 9 in the pipe 8 is adapted to control the flow of steam from the boilers 7 to the turbine 6.

A pressure controlled valve 11 is inserted in the pipe 10 which connects the high pressure line 3 and the low pressure line 8. This pipe 10 conducts steam from the high pressure line 3 through a desuperheater 12 and carries a check valve 13 between the desuperheater 12 and the pipe 8 to prevent steam from flowing back from the pipe 8 towards the pipe 3.

The diaphragm chamber 14 of the valve 11 is connected to one side of a pilot valve 15 by a conduit 16. The other side of the pilot valve 15 is connected to a master control unit, generally indicated by the reference numeral 17, by a conduit 18. This master control 17 is made up of a pair of pressure actuated valves 19 and 20, the diaphragms of which are connected together and to the pipe 10 by a conduit 21. It will be noted that the conduit 21 enters the pipe 10 at a point between the pipe 3 and the valve 11.

This master control 17 is of the general type described in my copending application Serial No. 320,836, filed November 21st, 1928 and has the valves 19 and 20 so arranged that an increase in pressure in the conduit 21 will open the valve 19 and close the valve 20 thus causing an increase in the operating pressure in the pipe 18. This operating pressure just referred to is controlled by the master control 17 and may be supplied from any convenient source. As illustrated, it comes from the pipe 10 through the conduit 22.

The bottom port of the pilot valve 15 is connected to a second master control generally indicated by the reference numeral 23, by the conduit 24. This master control 23 includes the pressure actuated valves 25 and 26, the diaphragms of which are connected to the pipe 10 by the conduit 27 which enters the pipe 10 at a point between the desuperheater 12 and the check valve 13. The operating pressure which is controlled by the master control 23 is conducted thereto from the pipe 10 by a conduit 28.

The master control 23 differs from the master control 17 in that the operating pressure enters the master control 23 through the valve 25 which is adapted to be closed by the application of pressure to its diaphragm while in the master control 17 the operating pressure enters through the valve 19 which is adapted to be opened by pressure on its diaphragm.

The pressure controlled pilot valve 15 is so constructed that when pressure is applied to its diaphragm, its bottom opening is closed and a free passage is provided between its two side openings thus permitting fluid to flow from the conduit 18 through the valve housing to the conduit 16. When the pressure on the diaphragm is reduced, a spring moves the valve to close the passage between the two side openings and when the valve is in this latter position a free passage is provided from the bottom opening to the right hand side opening thus permitting fluid to flow from the conduit 24 through the valve housing to the conduit 16. This pilot valve may be generally similar to that shown and described in Henry J. Mastenbrook's United States patent application Serial No. 451,560, filed May 12, 1930.

From the above description it will be seen that when pressure is applied to the diaphragm of the pilot valve 15 the diaphragm chamber 14 of the valve 11 will be connected to the source of supply of operating pressure under the control of the master control 17. When the pressure on the pilot valve diaphragm is reduced the diaphragm chamber 14 of the valve 11 will be connected to and under the control of the master control 23.

The valve 11 may be of any suitable type, the one illustrated being normally held in closed position by the spring 29 and being adapted to be opened by the action of pressure on a diaphragm in well known manner.

When the governor valve 4 is open and the boiler 1 is generating steam, the high pressure turbine will operate and the steam which passes through it will be discharged at reduced pressure through the pipe 5. At the same time steam may or may not be supplied to the low pressure turbines 6 from the boilers 7. Under these conditions relatively high pressure will be applied to the diaphragm of the pilot valve 15 and its closure member will be seated on its bottom seat as illustrated in the drawing. This will connect the diaphragm chamber of the valve 11 to the master control 17 and the valve 11 will act as a relief valve and steam not needed in the high pressure turbine 2 will be discharged through the pipe 10, the desuperheater 12 and the check valve 13 to the pipe 8 which conducts it to the low pressure turbines 6. The action of the valve 11 under these conditions is controlled by the master control 17. For example, if the high pressure turbine 2 is taking all of the steam generated by the boiler 1 the pressure in the pipe 10 will be at a certain value. This pressure is conducted to the diaphragms of the valves 19 and 20 by the conduit 21 and the springs of these valves may be so adjusted that, under this pressure, the valve 19 will be closed by its spring. This will shut off the operating pressure from the conduit 18 and from the diaphragm of the valve 11 allowing the spring 29 to hold the valve 11 closed. Thus there will be no flow of steam through the pipe 10. However, if the high pressure boiler 1 is generating more steam than the turbine 2 requires, the pressure in pipe 10 will rise to a point above the pressure at which the valve 19 will remain closed and this valve will be opened permitting the operating fluid to pass through the master control 17, the conduit 18, the pilot valve 15 and the conduit 16 to the diaphragm chamber 14 of the valve 11. This pressure will open the valve 11 allowing a certain amount of steam to pass therethrough into the low pressure turbine 6 through the pipe 8 and will thus relieve the pressure in the pipe 10 between the pipe 3 and the valve 11. As the pressure in the pipe 10 falls the valve 19 will be correspondingly closed and the valve 20 opened thus reducing the pressure of the operating fluid in the conduit 18 with the resulting closure of the valve 11.

This master control arrangement provides a very sensitive and efficient regulating means whereby, when the high pressure turbine 2 is operating, any excess pressure in the line leading to the turbine may be relieved and the excess steam used to operate low pressure turbines, or for any other desired purpose.

In case the governor valve 4 is completely closed there will be no pressure on the diaphragm of the pilot valve 15 and its closure member will be lifted to the top seat by the spring. Under these conditions the diaphragm of the valve 11 will be connected to the master control 23 through the conduit 24. This master control 23 operates in somewhat the reverse manner from the master control 17 and is connected to control the valve 11 so that it acts to reduce the pressure of the steam generated by the high pressure boiler to a pressure suitable for use in the low pressure turbine 6. The master control 23 regulates the operating pressure which is applied to the diaphragm of the valve 11 in inverse proportion to the pressure in the pipe 10 at a point between the desuperheater 12 and the check valve 13. If the pressure in the pipe 10, and consequently in the pipe 27, increase above the desired point, the valve 25 will tend to close and the valve 26 will open wider. The result of this will be to reduce the pressure in the conduits 24 and 16 and in the diaphragm chamber 14 of the valve 11 thus allowing the spring 29 to close the valve 11. This closure of the valve 11 results in a corresponding reduction of pressure in the pipe 10 between the valve 11 and the pipe 8. When the pressure in the pipe 10 between the desuperheater 12 and the check valve 13 falls below the desired value the action of the master control 23 is just opposite of that above described and the operating pressure in the conduit 24 will be increased, thus opening the valve 11 and bringing the steam which enters the pipe 8 back to the desired pressure.

In operating a steam power plant of the type described, my improved valve control hook-up provides a very efficient flexible and simple automatic means for taking care of any excess high pressure steam while the high pressure turbine is operating and automatically operates to reduce the pressure of the steam generated by the high pressure boiler 1 in case the high pressure turbine is taken off the line. With the use of my apparatus, it is only necessary that the governor valve 4 close to cut out the high pressure turbine 2 and use all the steam generated by the boiler 1 in the low pressure turbine 6. In this manner, the low pressure boilers may be held in reserve or operated only to take care of unusual conditions.

These boilers may be essentially held for stand-by operation or otherwise employed as efficiency dictates.

While the operation of the pilot valve 15 has been illustrated and described as being dependent upon the operation of the turbine 2 it will be understood that the pilot valve or its equivalent might readily be made subject to the influence of varying pressures in other parts of a power plant system. I wish to note further that one of the cardinal aspects of my invention is the provision of agencies, i. e. the two master controls which under like conditions give opposite effects, and which effects can be used to operate a third agency, i. e. the valve 11 under conditions coming about and reflected through such means as the pilot valve 15. I wish also to note that while I have illustrated my invention as employing two master controls, I appreciate that one master control would serve the purpose were adequate reversing connections supplied and arranged herewith.

It will be seen by those skilled in the art, that my invention is adapted to be used in other situations where it is desired to have one or more pressure operated valves controlled to regulate the flow of fluid through a pipe as relief valves under certain conditions and as reducing valves under certain other conditions. I do not therefore limit myself to the precise details of the embodiment of my invention herein shown and described, but claim as my invention all forms thereof, coming within the scope of the appended claims.

I claim:

1. In apparatus of the class described, a pipe, a pressure actuated valve in said pipe, means for controlling said valve to act as a pressure relief valve adapted to open when the pressure reaches a predetermined amount, means for controlling said valve to act as a pressure reducing valve and means responsive to external conditions for switching said valve from the influence of one of said controlling means to the other.

2. Apparatus of the class described including a pressure actuated valve having a pressure chamber, a conduit leading from said pressure chamber to a pressure actuated three-way pilot valve, a plurality of separate valve means for regulating the pressure in said pressure chamber, conduits leading from said pilot valve to each of said pressure regulating means, and means for actuating said pilot valve to connect said conduit leading from the pressure chamber to one of the conduits leading from said pilot valve to one of said pressure regulating means.

3. In apparatus of the class described, a pipe, a pressure actuated valve in said pipe and adapted to control the flow of fluid therethrough, master control means responsive to the pressure in said pipe on one side of said valve for controlling the action of said valve, master control means responsive to the pressure in said pipe on the other side of said valve for controlling the action of said valve and means for operatively connecting one of said controlling means under certain conditions and the other of said controlling means under certain other conditions to said valve.

4. In combination a pipe, a pressure actuable valve in said pipe, fluid conducting means leading from said pipe to said valve, means interposed in said fluid conducting means and controlling communication therethrough and with a different source of pressure and in turn controlled by pressure in said pipe on one side of said valve, a second similar means controlled by the pressure in said pipe on the other side of said valve and means in said fluid conducting means between said valve and both said first named means for controlling fluid communication between said first named means and said valve.

5. In combination a pipe, a pressure actuable valve in said pipe, fluid conducting means leading from said pipe to said valve, means controlled solely by pressure in said pipe on one side of said valve, and interposed in said fluid conducting means and controlling communication therethrough, a second similar means controlled solely by the pressure on the other side of said valve and means in said fluid conducting means between said valve and both said first named means for controlling fluid communication between said first named means and said valve.

6. In combination a pipe, a pressure actuable valve in said pipe, fluid conducting means leading from said pipe to said valve, means interposed in said fluid conducting means and controlling communication therethrough and controlled by pressure in said pipe on one side of said valve, a second similar means controlled by the pressure on the other side of said valve and means responsive to changes of pressure in said pipe and disposed in said fluid conducting means between said valve and both said first named means for controlling fluid communication between said first named means and said valve.

7. In combination a pipe, a pressure actuable valve in said pipe, a master control for operating said valve as a reducing valve, a master control for operating said valve as a relief valve and automatically operable means for connecting one of said master controls to the exclusion of the other to operate said valve.

8. In combination a pipe, a pressure actuable valve in said pipe, a master control for operating said valve as a reducing valve, a master control for operating said valve as a relief valve and means responsive to changes in pressure conditions in said pipe for connecting one of said master controls to the exclusion of the other to operate said valve.

9. In combination a pipe, a pressure actuated valve in said pipe, a pressure actuated master control for controlling the operating pressure supplied to said valve in response to changes in valve inlet pressure, and a pressure actuated master control for controlling the operating pressure supplied to said valve in response to changes in valve outlet pressure.

10. In combination a pipe, a pressure actuable valve in said pipe, connections from said pipe to said valve for operating it either as a reducing valve or as a relief valve and valve means in said connections for effecting the operation of said valve as a relief valve to the exclusion of its operation as a reducing valve and vice versa.

11. In combination a pipe, a pressure actuable valve in said pipe, connections from said pipe to said valve for operating it either as a reducing valve or as a relief valve and means responsive to pressure changes in said pipe disposed in said connections for effecting the operation of said valve as a relief valve to the exclusion of its operation as a reducing valve and vice versa.

12. In combination a high pressure fluid system leading to a fluid consuming device, a valve for controlling the flow of fluid to said device, a low pressure system, fluid conducting means connecting said systems, a valve in said fluid conducting means, means for operating said valve as a relief valve to permit the flow of fluid from the high pressure system to the low pressure system when the pressure in the high pressure system exceeds a predetermined amount, means for operating said valve as a reducing valve for throttling the flow of fluid from the high pressure system to the low pressure system and means responsive to the pressure of fluid between the first named valve and said fluid consuming device for connecting one of said last named means to the exclusion of the other of said last named means, for operating said last named valve.

13. In combination a high pressure fluid system leading to a turbine, a throttle valve for said turbine, a low pressure system, a pipe connecting said systems, a valve in said pipe, means responsive to changes in pressure in said high pressure system for operating said valve as a relief valve, means responsive to changes in pressure in said low pressure system for operating said valve as a reducing valve, and means responsive to the changes in pressure between said throttle valve and said turbine for connecting one of said means to the exclusion of the other of said means for operating said last named valve.

14. In combination a high pressure fluid system including a prime mover, a low pressure system, fluid conducting means connecting said systems, a valve in said fluid conducting means, means for operating said valve as a relief valve to permit the flow of fluid from the high pressure system to the low pressure system when the pressure in the high pressure system exceeds a predetermined amount, means for operating said valve as a reducing valve for throttling the flow of fluid from the high pressure system to the low pressure system and means responsive to the flow of fluid through said prime mover for connecting one of said last named means to the exclusion of the other of said last named means for operating said valve.

HOWARD S. FRASER.